US012056988B2

(12) United States Patent
Meyer

(10) Patent No.: US 12,056,988 B2
(45) **Date of Patent: *Aug. 6, 2024**

(54) GAMING DEVICE WITH EXPANDING ACTIVE SYMBOL POSITIONS

(71) Applicant: Aristocrat Technologies Australia Pty Limited, North Ryde (AU)

(72) Inventor: Jason Meyer, Wyoming (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,186

(22) Filed: May 11, 2023

(65) Prior Publication Data

US 2023/0282069 A1 Sep. 7, 2023

Related U.S. Application Data

(63) Continuation of application No. 17/189,759, filed on Mar. 2, 2021, now Pat. No. 11,688,242.

(30) Foreign Application Priority Data

Apr. 22, 2020 (AU) ................................ 2020901268
Sep. 15, 2020 (AU) ................................ 2020233664

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC .. G07F 17/3213; G07F 17/34; G07F 17/3267; G07F 17/3258; G07F 17/326
See application file for complete search history.

(56) References Cited

U.S. PATENT DOCUMENTS

| | | | |
|---|---|---|---|
| 9,978,222 | B2 | 5/2018 | Walker |
| 2005/0119043 | A1 | 6/2005 | Berman |

(Continued)

OTHER PUBLICATIONS

Aristocrat, Moon Drifter video, https://www.youtube.com/watch?v=EmyYyzX1rKs, Circa 2013-2014.

(Continued)

*Primary Examiner* — Justin L Myhr
(74) *Attorney, Agent, or Firm* — Brownstein Hyatt Farber Schreck LLP

(57) ABSTRACT

A gaming device comprises a display, a processor, and a memory storing (i) a plurality of symbol position states, each defining a number of active symbol positions in each of a plurality of columns of symbol positions. Also stored in memory is data defining a plurality of sets of reel strips including a first set of reels strips, wherein each reel strip of the first set has a first stack length defining a number of consecutive reel strip positions containing the same symbol, and a second set of reel strips, wherein each reel strip of the second set of reel strips has a second stack length shorter than the first stack length. In at least a first game instance, the processor selects symbols from the first set of reel strips for display in the plurality of columns of symbol positions of the first symbol state. Responsive to a trigger condition being met, the processor updates the current symbol position state to a second symbol position state comprising at least one additional active symbol position relative to the first symbol position state. Subsequent symbol position states will have progressively shorter stacks in one or more of the corresponding sets of reel strips.

20 Claims, 19 Drawing Sheets

(56) References Cited

U.S. PATENT DOCUMENTS

| | | | |
|---|---|---|---|
| 2012/0115570 | A1 | 5/2012 | Collette |
| 2017/0011582 | A1 | 1/2017 | Fong |
| 2017/0024955 | A1 | 1/2017 | Pawloski |
| 2018/0061174 | A1 | 3/2018 | Boese |
| 2018/0089931 | A1 | 3/2018 | Hawkins |
| 2018/0268659 | A1 | 9/2018 | Chesworth |
| 2018/0308312 | A1 | 10/2018 | Weiss |
| 2019/0295361 | A1 | 9/2019 | Fong |
| 2020/0074787 | A1 | 3/2020 | Casey |

OTHER PUBLICATIONS

Scientific Games, Ultimate Fire Link SG Gaming—Ultimate Fire Link By The Bay, 2017 G2E.

Office Action (Non-Final Rejection) dated Mar. 21, 2022 for U.S. Appl. No. 17/189,759 (pp. 1-16).

Office Action (Final Rejection) dated Aug. 24, 2022 for U.S. Appl. No. 17/189,759 (pp. 1-13).

Office Action (Non-Final Rejection) dated Feb. 7, 2023 for U.S. Appl. No. 17/189,759 (pp. 1-12).

Notice of Allowance dated Apr. 19, 2023 for U.S. Appl. No. 17/189,759 (pp. 1-8).

300

341 342 343 344 345

332

| | Reel strip position | Reel 1 | Reel 2 | Reel 3 | Reel 4 | Reel 5 |
|---|---|---|---|---|---|---|
| 301 | 1 | Pic 1 | 10 | A | Q | K |
| 302 | 2 | Feather | Q | Wild | A | 10 |
| 303 | 3 | Stack | K | Pic 1 | 10 | A |
| 304 | 4 | Stack | Pic 1 | Feather | Wild | Wild |
| 305 | 5 | Stack | A | Q | Pic 2 | Pic 2 |
| 306 | 6 | Stack | Pic 1 | K | J | A |
| 307 | 7 | Stack | J | K | Stack | Q |
| 308 | 8 | Stack | Feather | Wild | Stack | Pic 3 |
| 309 | 9 | Stack | Pic 1 | 10 | Stack | 9 |
| 310 | 10 | Stack | Pic 4 | Pic 1 | Stack | J |
| 311 | 11 | Pic 2 | Pic 5 | 9 | Stack | A |
| 312 | 12 | 10 | 9 | Pic 5 | Stack | Feather |
| 313 | 13 | Pic 1 | K | Stack | Stack | K |
| 314 | 14 | Pic 3 | 9 | Stack | Stack | Pic 4 |
| 315 | 15 | K | Wild | Stack | Pic 2 | 9 |
| 316 | 16 | K | 10 | Stack | 9 | Wild |
| 317 | 17 | J | Wild | Stack | A | K |
| 318 | 18 | Q | Pic 2 | Stack | Feather | Pic 1 |
| 319 | 19 | A | Q | Stack | 10 | Stack |
| 320 | 20 | Pic 1 | Stack | Stack | K | Stack |
| 321 | 21 | Pic 1 | Stack | Pic 3 | Pic 3 | Stack |
| 322 | 22 | J | Stack | Pic 4 | Pic 4 | Stack |
| 323 | 23 | Pic 3 | Stack | K | 10 | Stack |
| 324 | 24 | 9 | Stack | 10 | J | Stack |
| 325 | 25 | Pic 5 | Stack | J | Pic 1 | Stack |
| 326 | 26 | A | Stack | 10 | 9 | Stack |
| 327 | 27 | 10 | Stack | Pic 1 | 10 | Pic 1 |
| 328 | 28 | Pic 4 | K | Q | Wild | 10 |
| 329 | 29 | 9 | 10 | J | Q | Pic 2 |
| 330 | 30 | Q | Q | Pic 4 | K | J |

351 352 353

335

331

FIG. 3

GAMING DEVICE WITH EXPANDING ACTIVE SYMBOL POSITIONS

CROSS-REFERENCE TO RELATED APPLICATIONS

The present application is a continuation of U.S. patent application Ser. No. 17/189,759, filed Mar. 2, 2021, now U.S. Pat. No. 11,688,242, which claims priority to Australian Provisional Patent Application Serial No. 2020901268 filed Apr. 22, 2020 and Australian Patent Application Serial No. 2020233664 filed Sep. 15, 2020, the contents of which are hereby incorporated by reference in their entirety.

FIELD

The present application relates to a gaming device, a method of operating a gaming device and a system where a number of active symbol positions can expand.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

One example includes a gaming device comprising a display, a processor, and a memory storing: a plurality of symbol position data states, each symbol position data state defining a respective number of active symbol positions in each of a plurality of columns of symbol positions. The memory further stores data defining a plurality of sets of reel strips including, a first set of reel strips, wherein at least one reel strip of the first set of reel strips has a first stack length defining a number of consecutive reel strip positions having a common configurable symbol, and a second set of reel strips, wherein at least one reel strip of the second set of reel strips has a second stack length shorter than the first stack length. Additionally, the memory preferably stores and instructions which, when executed by the processor, cause the processor to perform various operations. In an example, the stored instructions because the processor to determine a first base game outcome of an instance of a base game based on a random number generator outcome; control the display system to present the first base game outcome in a first window of the one or more display devices; and in response to the first base game outcome, determine that a feature game trigger condition of a feature game exists. In response to determining that a feature game trigger condition exists, further operations include initiating a series of multiple feature game instances, including, at the beginning of the series of feature game instances, controlling the display to display the plurality of columns of symbol positions based on the first symbol position state of the plurality of symbol position states; and in at least a first feature game instance, select symbols from the first set of reel strips for display in the plurality of columns of symbol positions of the first symbol state. The processor will further operate to detect in an instance outcome a triggered condition, and in response to the triggered condition: update the current symbol position data state to the second symbol position data state comprising at least one additional active symbol position in each of the plurality of columns of symbol positions; control the display to display the plurality of columns of symbol positions based on the second symbol position state; in at least a subsequent game instance, select symbols from the second set of reel strips for display in the plurality of columns of symbol positions of the second symbol position state; and in each feature game instance outcome of the multiple feature game instances, evaluate the selected symbols to determine whether to make one or more awards.

A further example includes a method of operating a gaming device comprising a display, and a memory storing: a plurality of symbol position states, each defining a number of active symbol positions in each of a plurality of columns of symbol positions; and data defining a plurality of sets of reel strips, wherein each of the plurality of symbol position states corresponds to a set of reel strips from the plurality of sets of reel strips. The method operates to perform various operations including: upon a trigger condition being met, initiating a series of game instances, to display the plurality of columns of symbol positions based on a first symbol position state of the plurality of symbol position states; in at least a first game instance, selecting symbols from a first set of reel strips for display in the plurality of columns of symbol positions of the first symbol state, wherein the first set of reel strips corresponds to the first symbol position state and has a first stack length. In response to an expansion condition being met, operations further include updating the current symbol position state to a second symbol position state comprising at least one additional active symbol position relative to the first symbol position state in each of the plurality of columns of symbol positions and controlling the display to display the plurality of columns of symbol positions based on the second symbol position state; and in at least the subsequent game instance, selecting symbols from a second set of reel strips for display in the plurality of columns of symbol positions of the second symbol position state, wherein the second set of reel strips corresponds to the second position state and has a second stack length that is smaller than the first stack length; and in each game instance of the series of game instances, evaluating the selected symbols to determine whether to make one or more awards.

A yet further example includes a gaming system comprising: a processor; and a memory storing: a plurality of symbol position states, each defining a number of active symbol positions in each of a plurality of columns of symbol positions; and data defining a plurality of sets of reel strips including a first set of reels strips, wherein each reel strip of the first set of reel strips has a first stack length defining a number of consecutive reel strip positions and a second set of reel strips, wherein each reel strip of the second set of reel strips has a second stack length shorter than the first stack length. The memory further stores instructions which, when executed by the one or more processors, cause the one or more processors to perform operations which include: upon a trigger condition being met, initiating a series of game instances, including by, at the beginning of the series of game instances, controlling a display to display the plurality of columns of symbol positions based on a first symbol position state of the plurality of symbol position states; and in at least a first game instance, select symbols from the first set of reel strips for display in the plurality of columns of symbol positions of the first symbol state. In response to an expansion condition being met, operations further include updating the current symbol position state to a second symbol position state comprising at least one additional active symbol position relative to the first symbol position state in each of the plurality of columns of symbol positions and control the display to display the plurality of columns of symbol positions based on the second symbol position state; in at least the subsequent game instance, select symbols from the second set of reel strips for display in the plurality of columns of symbol positions of the second symbol position state; and in each game instance of the series of game instances, evaluate the selected symbols to determine whether to make one or more awards.

BRIEF DESCRIPTION OF THE DRAWINGS

FIG. 3 illustrates an example reel strip layout.

DETAILED DESCRIPTION

There is disclosed a gaming device, a method of operating a gaming device and a system where a number of active symbol positions can expand during a series of game instances such as the free games of a feature game. In the example, the number of active symbol positions increases by adding a row of symbol positions each time an expansion condition is met. At the same time, each time the number of active symbol positions is increased, the reel strips are changed to adjust the length of stacks of identical symbols on the reels so that they get shorter as the number of symbol positions increase. This keeps the chance of occurrence of symbols from the stacks in active symbol positions approximately constant. In some examples, the increase in the number of active symbol positions will be accompanied by an award or one or more additional spins.

Various embodiments of the present disclosure provide for increasing the height of reels or symbol display positions in a matrix without affecting the RTP of the game. These embodiments describe reducing the length of symbol stacks on reel strips that are used to generate symbols as the height of the reels or columns increases. Further, some embodiments provide different set of reel strips to be used as the height of the columns increases. Switching out reel strips is an efficient way to handle the change condition (associated with the increased column height), as it does not require any other change in parameters of the game (such as RNG or a mapping table between RNG outcome and reel stop positions).

Figure 1:
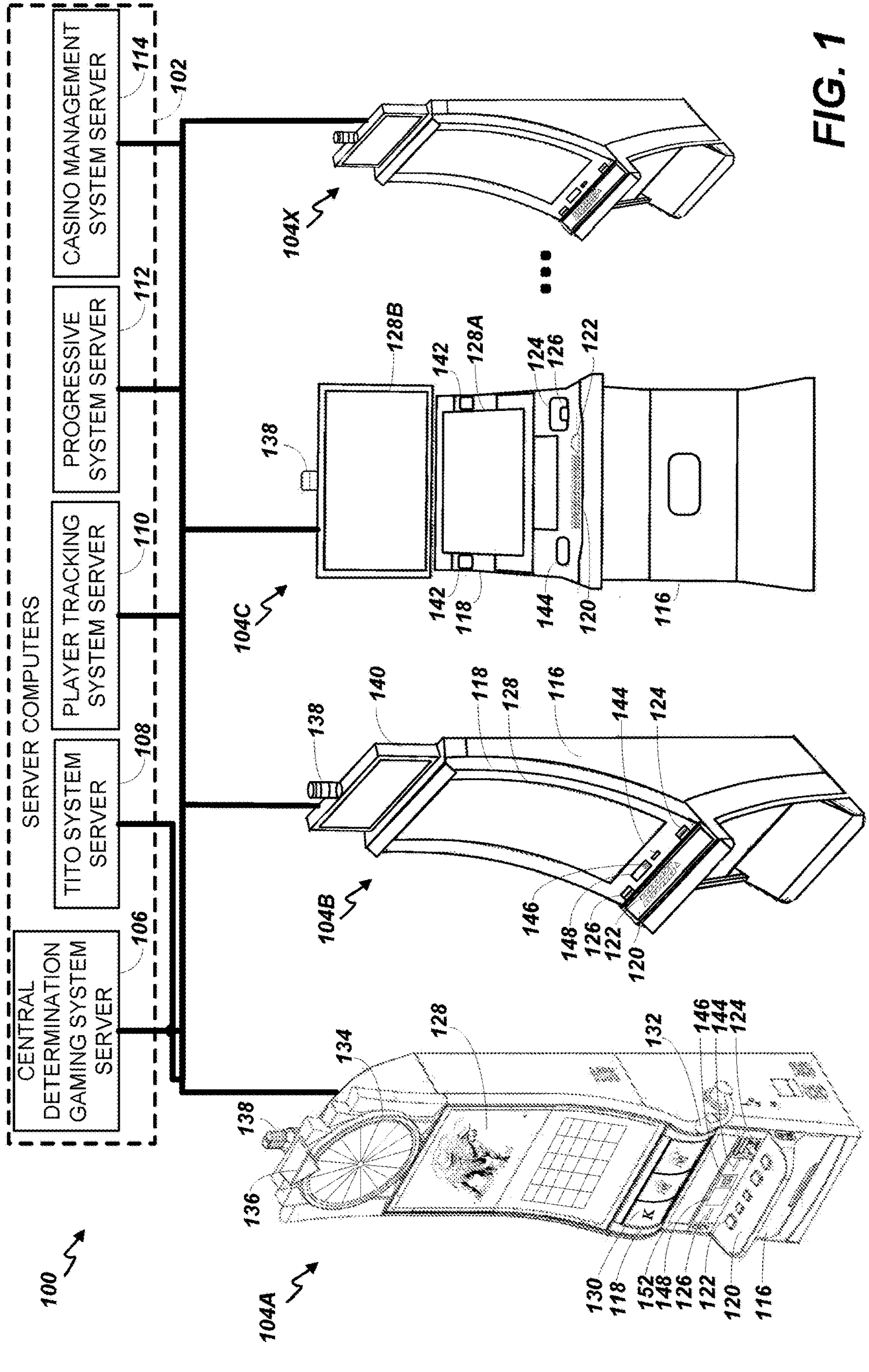
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
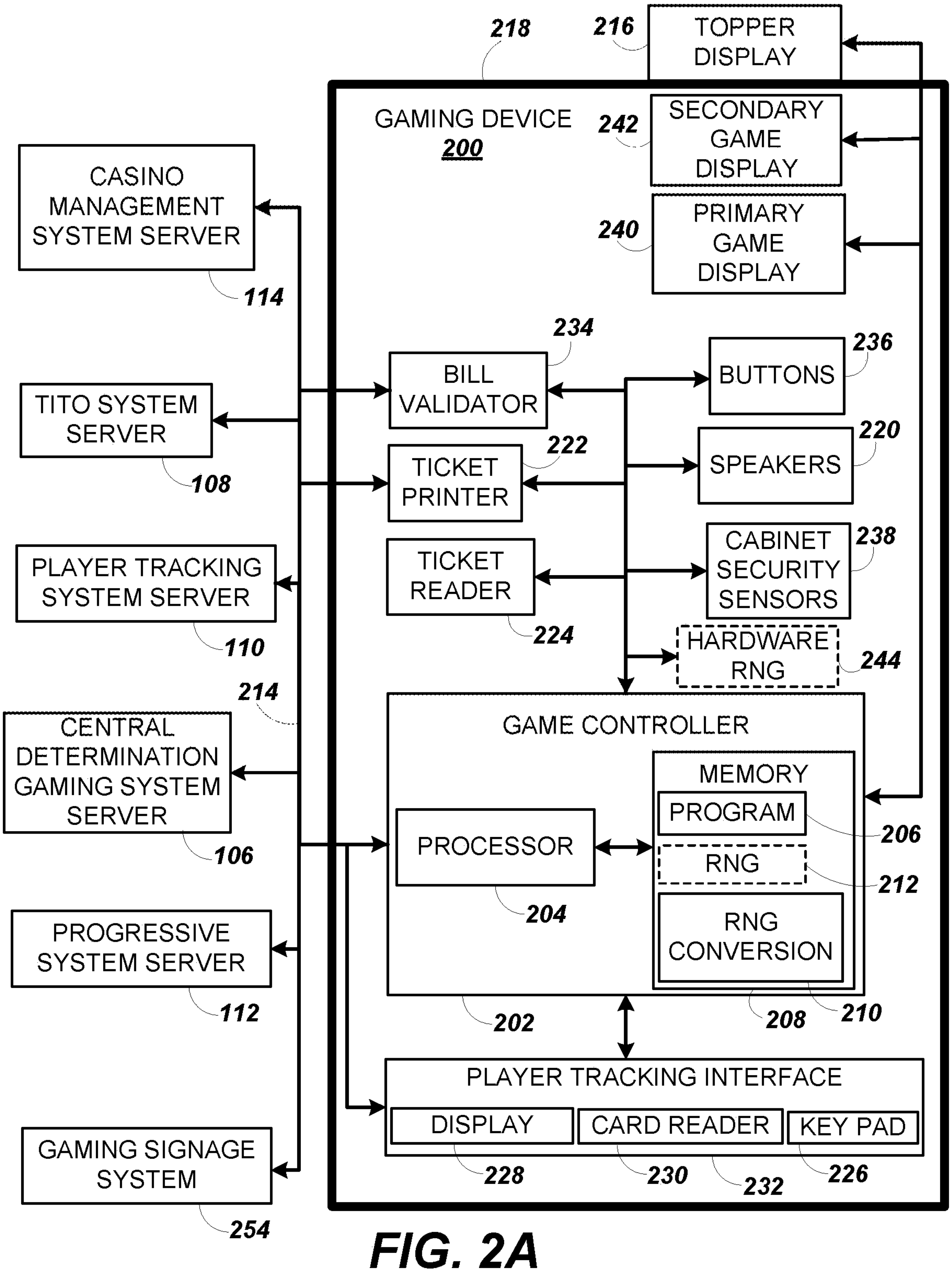
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat®

Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 1288 is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-1040 and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data. For example, various data structures of the currently disclosed techniques (trigger data structure, reel strip data structure, a configuring symbol data structure, for example, and others as described herein) may be stored in one, or across multiple, such storage media).

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI))

to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
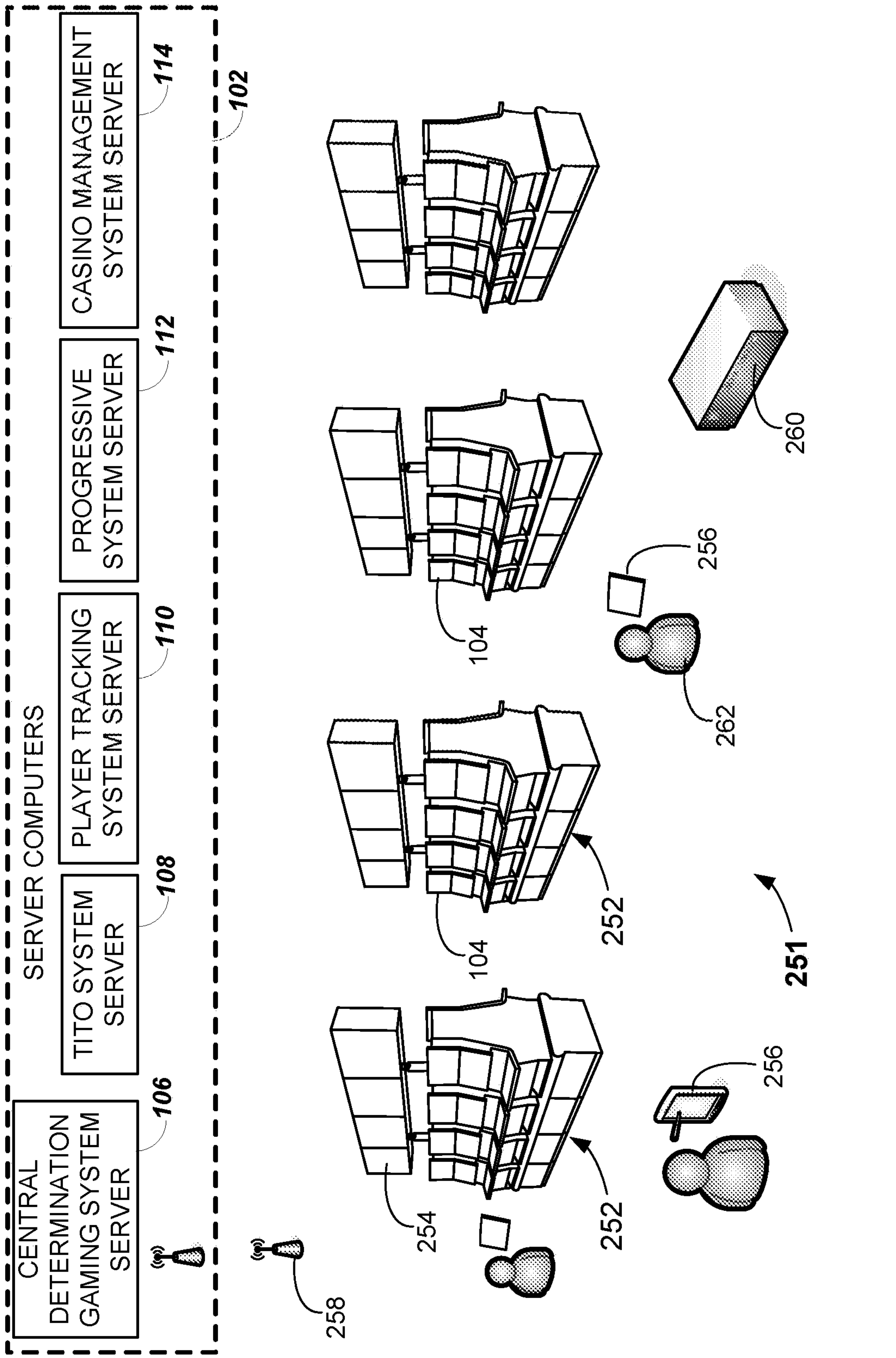
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
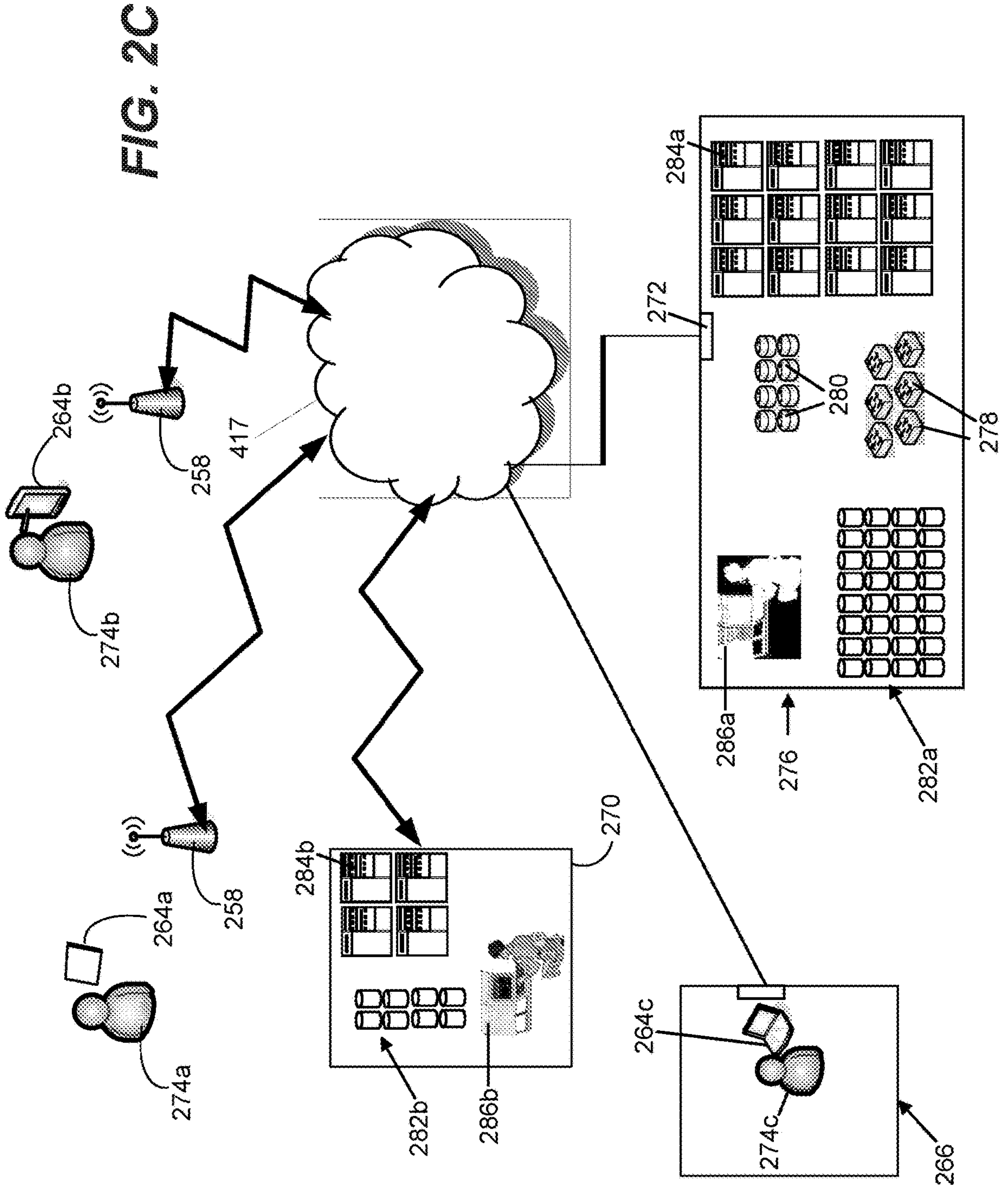
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 2D:
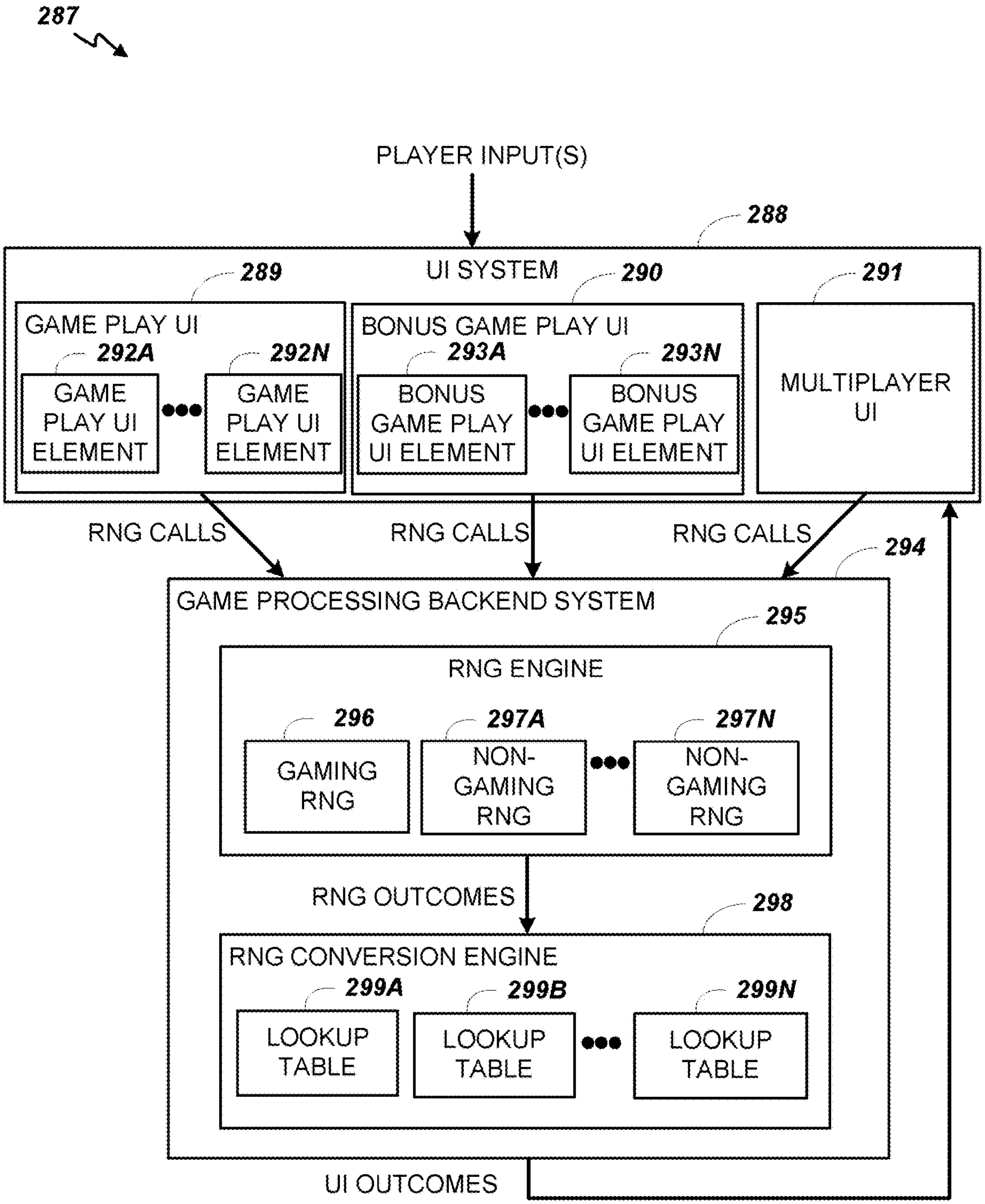
FIG. 2D illustrates, in block diagram form, an implementation of a game processing architecture algorithm that implements a game processing pipeline for the play of a game in accordance with various implementations described herein.

FIG. 2D illustrates, in block diagram form, an implementation of a game processing architecture 287 that implements a game processing pipeline for the play of a game in accordance with various implementations described herein. As shown in FIG. 2D, the gaming processing pipeline starts with having a UI system 288 receive one or more player inputs for the game instance. Based on the player input(s), the UI system 288 generates and sends one or more RNG calls to a game processing backend system 294. Game processing backend system 294 then processes the RNG calls with RNG engine 295 to generate one or more RNG outcomes. The RNG outcomes are then sent to the RNG conversion engine 298 to generate one or more game outcomes for the UI system 288 to display to a player. The game processing architecture 287 can implement the game processing pipeline using a gaming device, such as gaming devices 104A-104X and 200 shown in FIGS. 1 and 2, respectively. Alternatively, portions of the gaming processing architecture 287 can implement the game processing pipeline using a gaming device and one or more remote gaming devices, such as central determination gaming system server 106 shown in FIG. 1.

The UI system 288 includes one or more UIs that a player can interact with. The UI system 288 could include one or more game play UIs 289, one or more bonus game play UIs 290, and one or more multiplayer UIs 291, where each UI type includes one or more mechanical UIs and/or graphical UIs (GUIs). In other words, game play UI 289, bonus game play UI 290, and the multiplayer UI 291 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 2D as an example, the different UI elements are shown as game play UI elements 292A-292N and bonus game play UI elements 293A-293N.

The game play UI 289 represents a UI that a player typically interfaces with for a base game. During a game instance of a base game, the game play UI elements 292A-292N (e.g., GUI elements depicting one or more virtual reels) are shown and/or made available to a user. In a subsequent game instance, the UI system 288 could transition out of the base game to one or more bonus games. The bonus game play UI 290 represents a UI that utilizes bonus game play UI elements 293A-293N for a player to interact with and/or view during a bonus game. In one or more implementations, at least some of the game play UI element 292A-292N are similar to the bonus game play UI elements 293A-293N. In other implementations, the game play UI element 291A-292N can differ from the bonus game play UI elements 293A-293N. The methods described below, for example in reference to FIGS. 4 and 13, include configuring reel strips, such as those of UI system 288, for example in either or both of game play UIs 289 and bonus game play UIs 290.

FIG. 2D also illustrates that UI system 289 could include a multiplayer UI 291 purposed for game play that differs or is separate from the typical base game. For example, multiplayer UI 291 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 295 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 2D does not explicitly depict that multiplayer UI 294 includes UI elements, multiplayer UI 291 could also include one or more multiplayer UI elements.

Based on the player inputs, the UI system 288 could generate RNG calls to a game processing backend system 294. As an example, the UI system 288 could use one or more application programming interfaces (APIs) to generate the RNG calls. To process the RNG calls, the RNG engine 295 could utilize gaming RNG 296 and/or non-gaming RNGs 297A-297N. Gaming RNG 296 could corresponds to RNG 212 or hardware RNG 244 shown in FIG. 2A. As previously discussed with reference to FIG. 2A, gaming RNG 296 often performs specialized and non-generic operations that comply with regulatory and/or game requirements. For example, because of regulation requirements, gaming RNG 296 could correspond to RNG 212 by being a cryptographic RNG or pseudorandom number generator (PRNG) (e.g., Fortuna PRNG) that securely produces random numbers for one or more game features. To securely generate random numbers, gaming RNG 296 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 298 processes each RNG outcome from RNG engine 295 and converts the RNG outcome to a UI outcome that is feedback to the UI system 288. With reference to FIG. 2A, RNG conversion engine 298 corresponds to RNG conversion engine 210 used for game play. As previously described, RNG conversion engine 298 translates the RNG outcome from the RNG 212 to a game outcome presented to a player. RNG conversion engine 298 utilizes one or more lookup tables 299A-299N to regulate a prize payout amount for each RNG outcome and how often the gaming device pays out the derived prize payout amounts. In one example, the RNG conversion engine 298 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 294 sends the UI outcome to the UI system 288. Examples of UI outcomes are symbols to display on a video reel or reel stops for a mechanical reel. In one example, if the UI outcome is for a base game, the UI system 288 updates one or more game play UI elements 292A-292N, such as symbols, for the game play UI 289. In another example, if the UI outcome is for a bonus game, the UI system could update one or more bonus game play UI elements 293A-293N (e.g., symbols) for the bonus game play UI 290. In response to updating the appropriate UI, the player may subsequently provide additional player inputs to initiate a subsequent game instance that progresses through the game processing pipeline.

Figure 5:
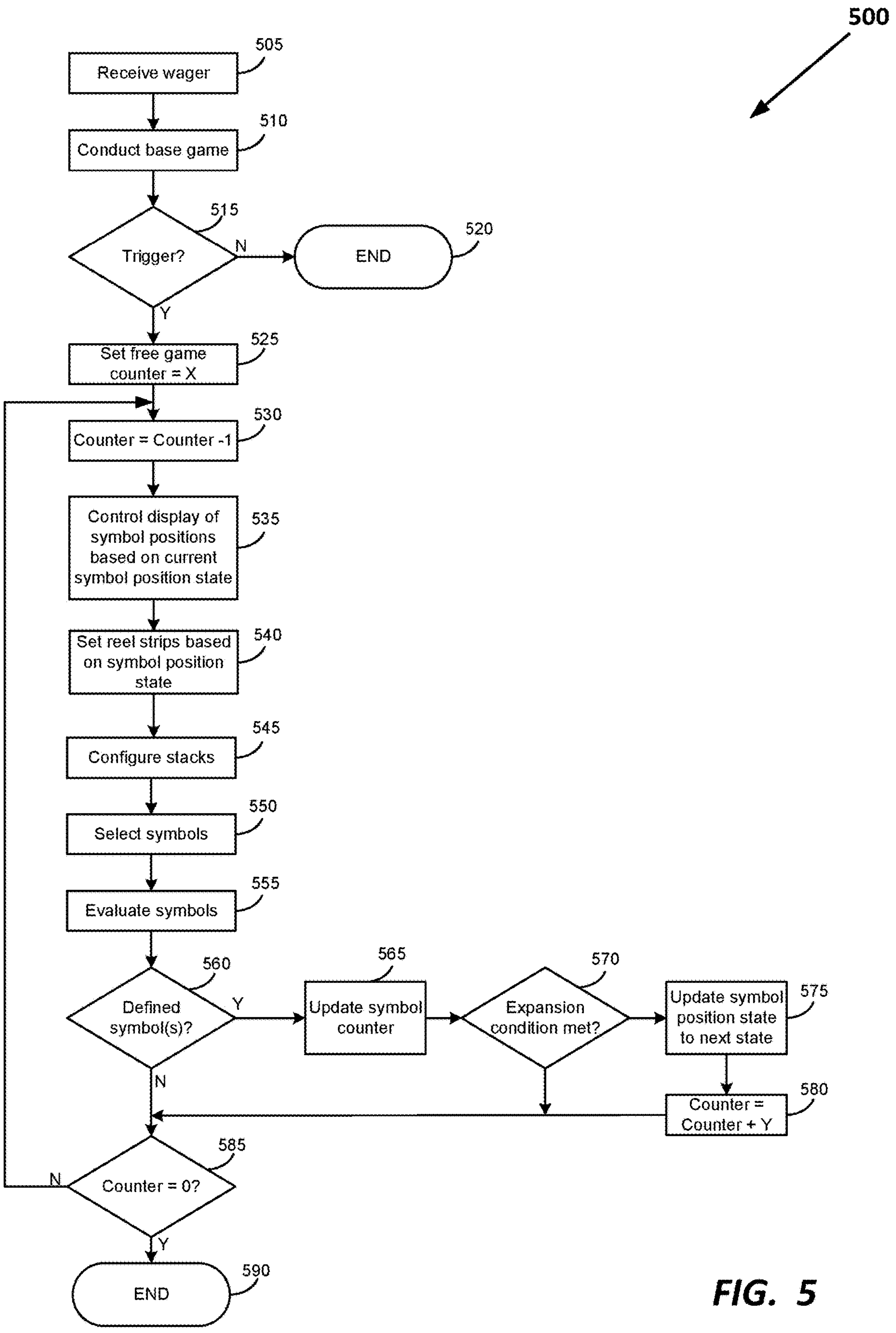
FIG. 5 is a flow chart of a method of operating a gaming device.
Figure 6:
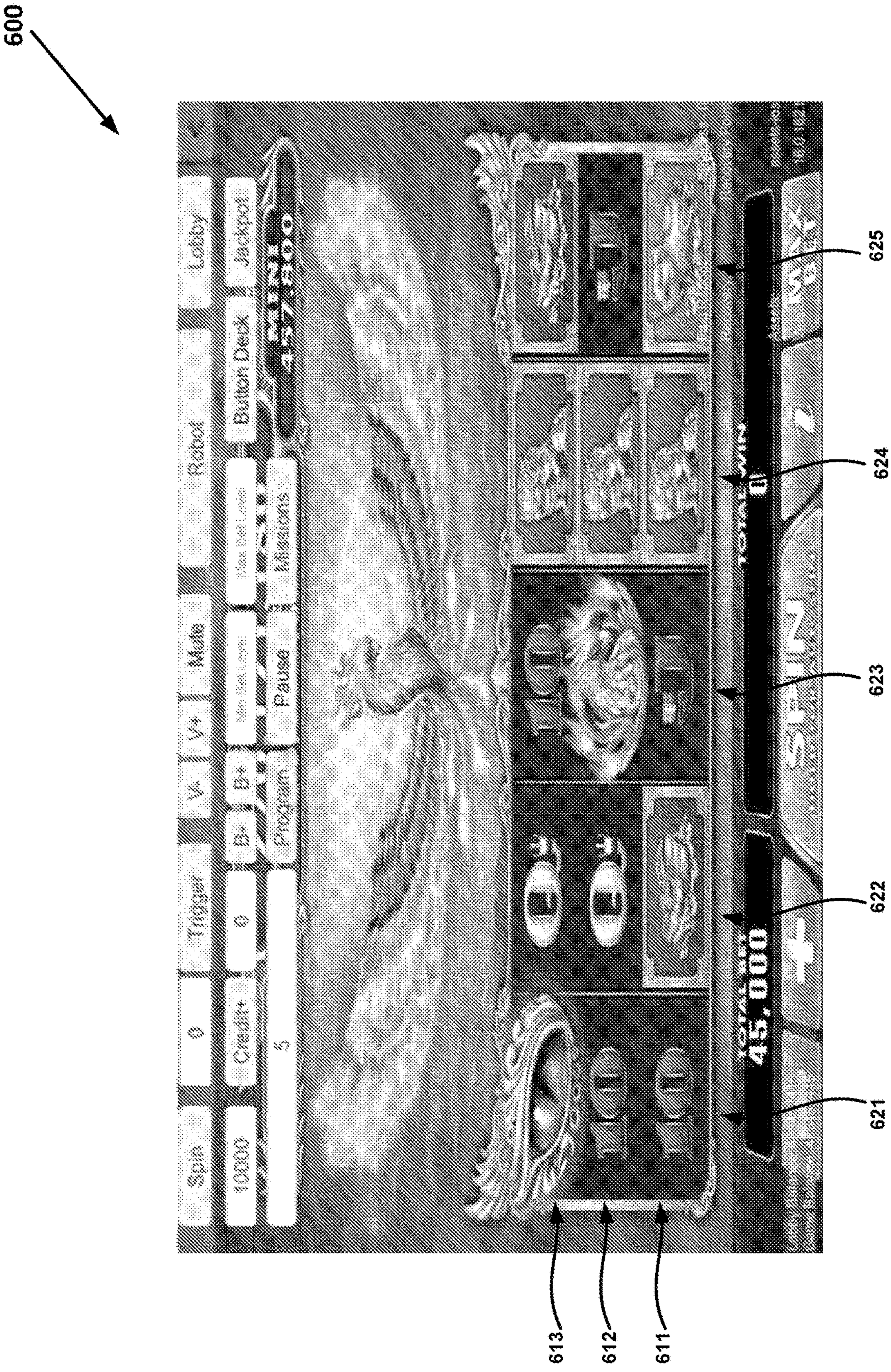
FIGS. 6 to 16 are exemplary screen displays.

FIG. 5 is a flow chart of an example embodiment of a method 500 of operating a gaming device. At step 505, the processor 204 receives a wager (e.g. in response to a player making a wager selection using buttons as described above). At step 510, the processor 204 conducts a base game, for example, a spinning reel game. FIG. 6 shows an example screen display 600 of a prototype of a base game where symbols are selected from five reel strips for display in five columns of symbol positions 621-625 with three symbols being selected for each reel such that there are also three rows 611-613 of symbol positions.

At step 515, the processor 204 determines whether a trigger condition is met in respect of the base game and if not, the method ends at step 520. An example of a trigger condition being met is shown in the example screen display 700 of FIG. 7. In this example, the trigger is the occurrence of three or more Phoenix Eye symbols 731,732,733.

Figure 7:
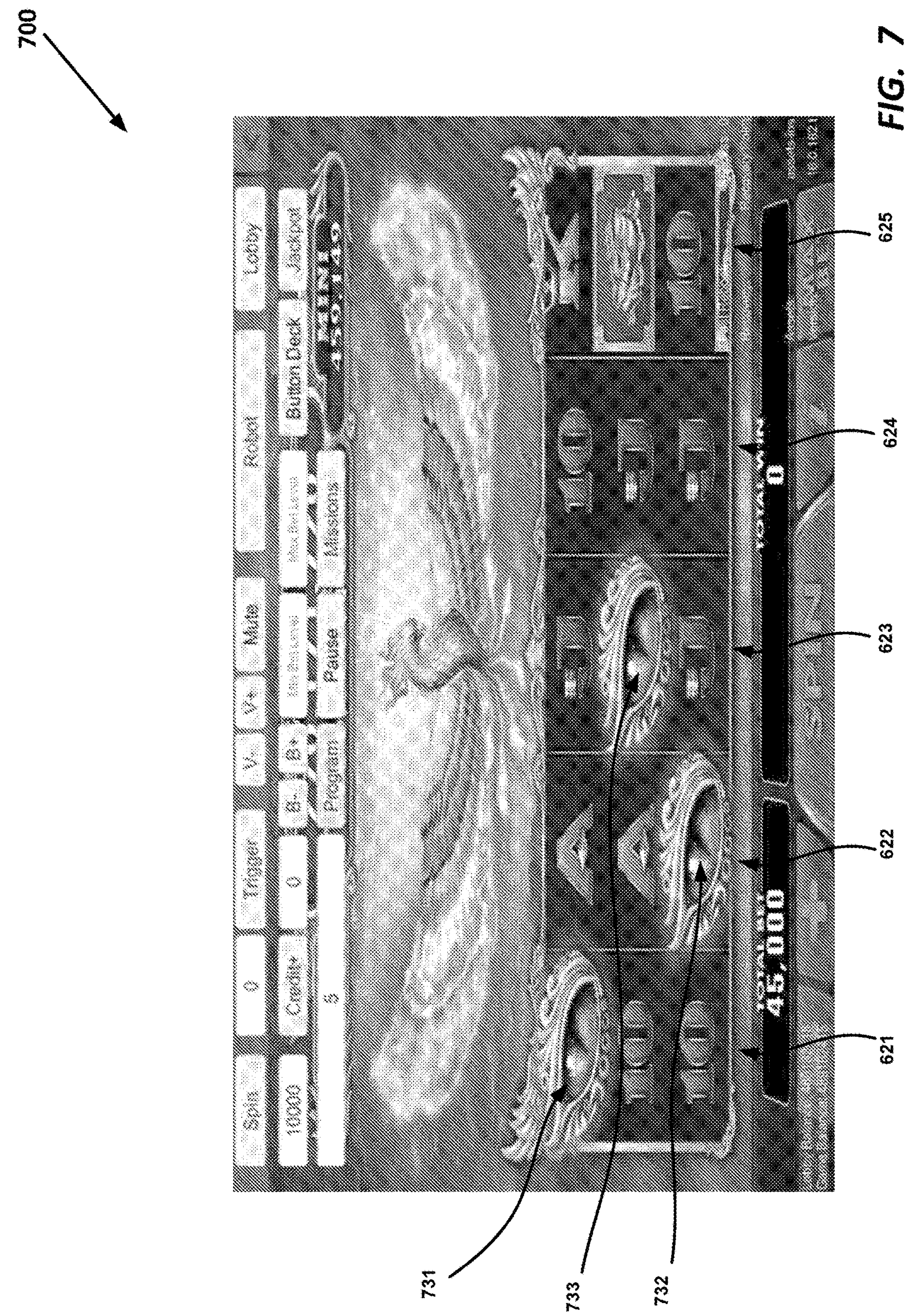
Figure 8:
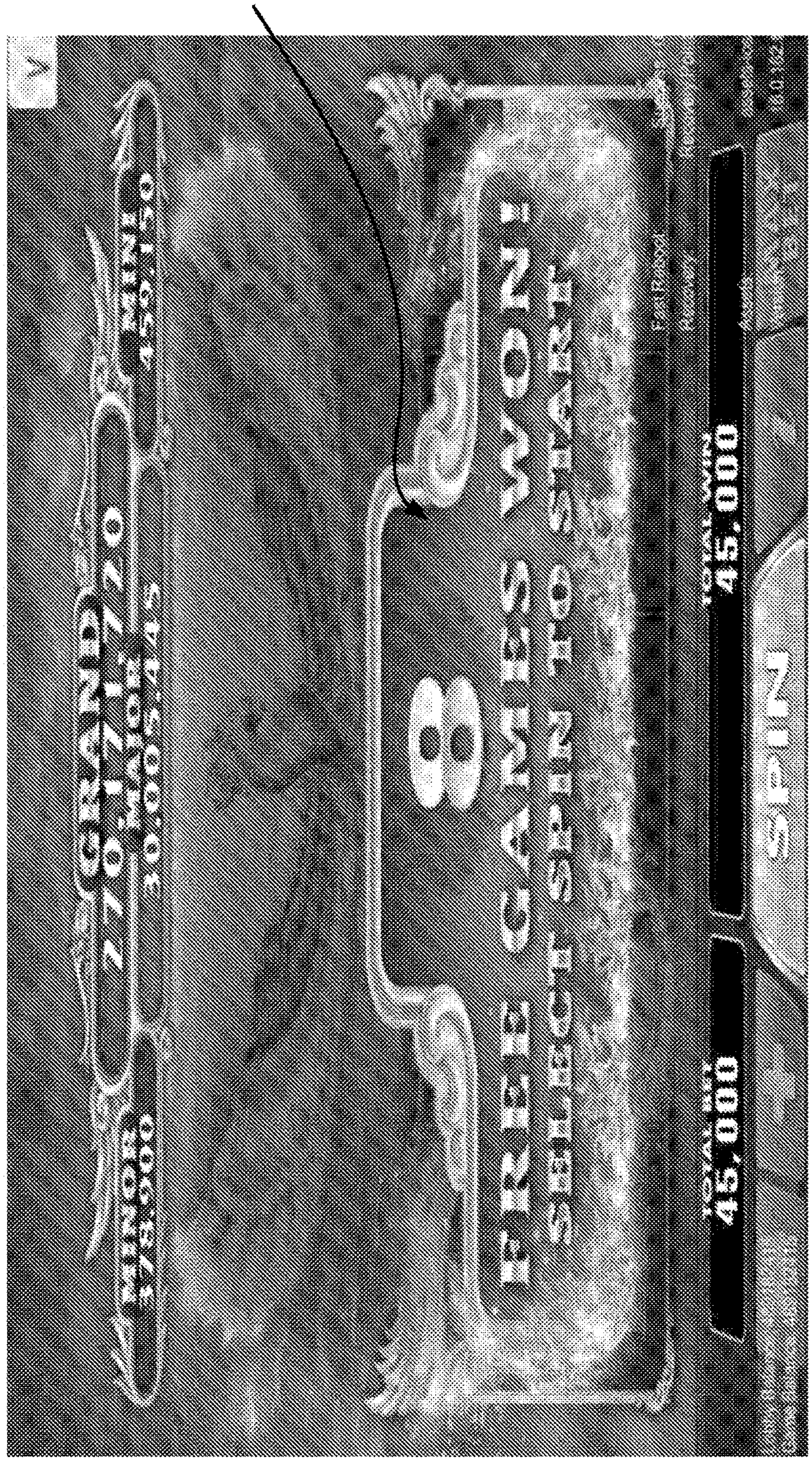

Upon the processor determining at step 515 that the trigger condition is met (e.g. as shown in FIG. 7), the processor 204 proceeds to step 525 and sets a free game counter in memory for a series of free game instances, in this example, the series has an initial value of eight free game instances. Processor 204 also controls the display 240 to display a screen display 800 having a message 810 indicating to the player the award of the free game instances: "8 FREE GAMES WON. SELECT SPIN TO START".

At step 530, the processor 204 decrements the counter by one.

Figure 9:
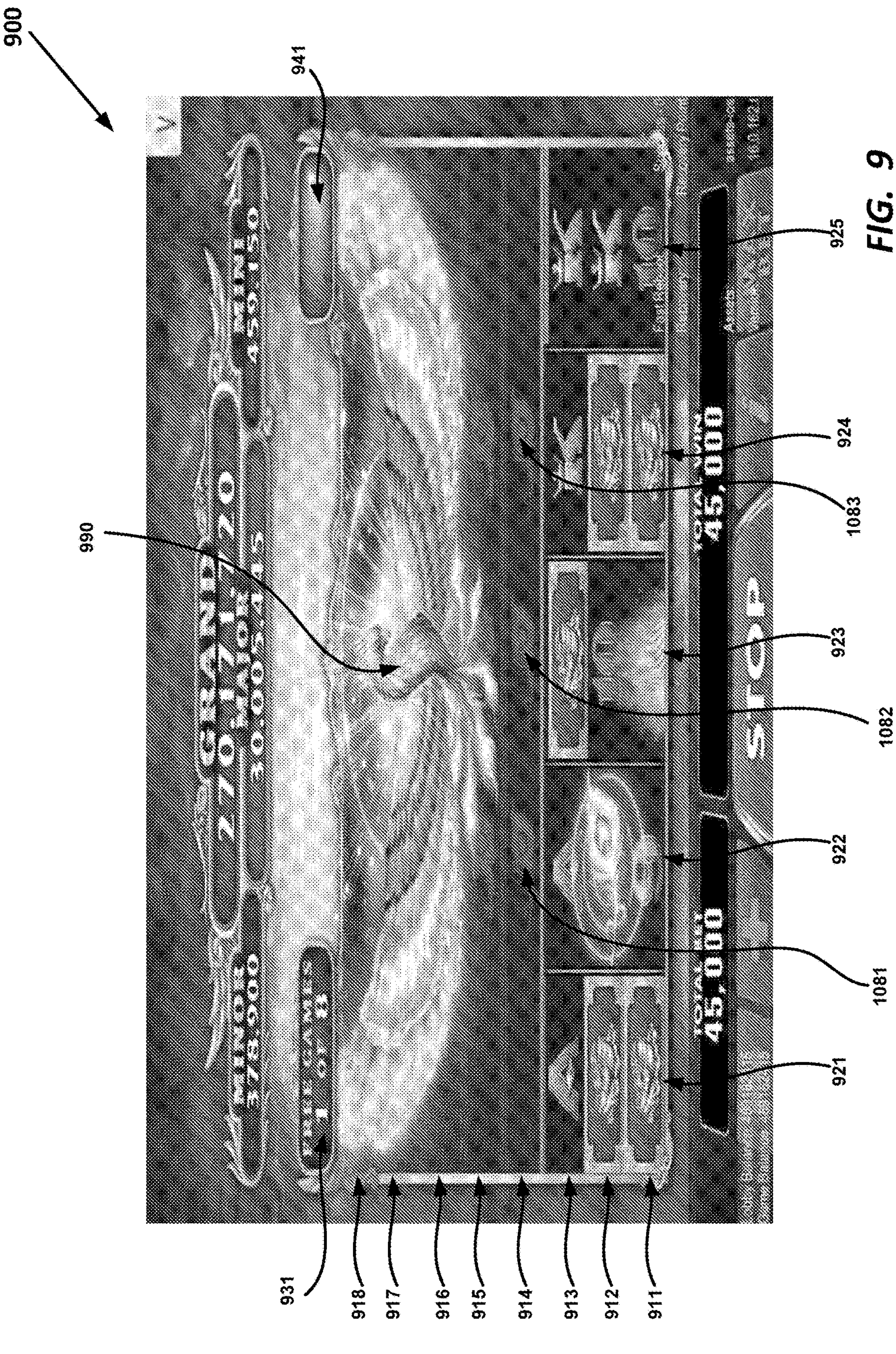

At step 535, the processor 204 controls the display 240 to display (e.g. as shown in FIG. 9) a feature game screen display 900 based on a current symbol position state, which in the example of FIG. 9 is an initial symbol position state.

Referring to FIG. 9, the screen display shows that there are five columns of symbol positions and that initially three symbol positions are active in each column such that there are three active rows 911-913 of symbol positions. Five additional rows 914-918 are represented as inactive with a Phoenix animation 990 overlay the majority of rows 915-918. The fourth row 914 has three greyed-out feather symbols 1081-1083 as a visual indicator to the player that this row can be activated by the collection of three feather symbols. The screen display of FIG. 9 shows that when the feature game is initially displayed, the reels are animated as spinning. FIG. 9 also shows a free game progress indicator 931 which has the message "Free Games 1 of 8" to indicate to the player that the gaming device is being operated to conduct the first of the series of eight free game instances. FIG. 9 also shows a defined symbol collection status 941, which in FIG. 9 is that no defined symbols have been collected.

At step 540, the processor sets the set of reel strips to be used for the current game instance based on the symbol position state. In this example, there are six sets of reel strips corresponding to respective ones of six different possible symbol position states. Each of these reel strips is different to the reel strips used to conduct the base game. In this example, each reel strip of each set of reel strips has a stack of symbols, which is configured, as indicated at 545. A stack of symbols is a plurality of consecutive positions occupied by the same symbol. In this example, the stacks of symbols of each set of reel strips are of different lengths. In this example, the stack lengths of the sets reel strips become progressively shorter as the number of symbol positions in a column increases. That is, the first set of reel strips associated with the initial (first) symbol position state has a stack length that is longer than that of the second set of reel strips associated with the second symbol position state where fourth row 914 is active which in turn has a stack length that is longer than that of the third set of reel strips associated with the third symbol position state where row 915 is active, etc. In this example, the shortest stack length is eight reel strip positions and matches the maximum number of active symbol positions (i.e. when all eight rows 911-918 are active).

In order to maintain the RTP of the game with an increasing row height, conventionally, the probability associated with landing a large stack would be reduced. This would allow the RTP to stay the same as the displayed reel height (though the number of rows) grows. However, reducing the probability associated with landing a stack is easily discernable by an experienced slot player. This decrease would result in reduced slot play, or reduced desirability of the bonus. In order to solve this problem, one aspect of this disclosure instead reduces the height of the stack instead of reducing the probability associated with landing the stack. This ensures that a stack of symbols has approximately the same chance of appearing irrespective of the number of symbol positions active in each column (e.g. the number of active rows).

In this example, the stacks of symbols are dynamically configured in each game instance by the processor 204 selecting, at step 540, one of a plurality of different symbols using weightings for the symbols stored in a weighted table in memory 208 and a value returned by the random number generator 212. After the symbol is selected, the graphic asset corresponding to the symbol is added at all the reel strip positions. Dynamically configuring the stacks using a weighted table is advantageous as it allows a variety of symbols to be presented as stacks and allows greater control over return to player. However, in other examples, a fixed symbol could be employed for the stacks.

FIG. 3 illustrates an example of a set 300 of five reel strips 341, 342, 343, 344, 345. In the example, for illustrative purposes, each reel strip has thirty reel strip positions 301-330. Each reel strip position of each reel has a symbol. For example, a "Wild" symbol 331 occupies the twenty-eighth reel strip position 328 of the fourth reel 344. In this example, each reel strip is shown with a stack of eight reel strip positions to be dynamically configured, e.g. stack 335 on the fifth reel—i.e. this set of reel strips is an example of a set of reel strips corresponding to the sixth symbol position state where all eight rows 911-918 are active; and in this example, the stack length for this sixth state is equal to the number of active rows. For the first position state, in this example embodiment, the stack would be 13 or more symbols, such that each subsequent symbol position state would include a stack length shorter by 1 (or more) symbols. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another. Additionally, in some examples, one or more (or all) reel strips associated with an individual symbol position state may have a different length then in another symbol 301-330 position state. For example, as noted above, each of the five reel strips 341, 342, 343, 344, 345 for this sixth symbol position state includes 30 reel strip positions; but in the first symbol position state may include a greater number of positions, for example, 35 or greater reel strip positions (35 accommodating the five additional positions in the stack of the first symbol position state). In other examples, rather than the length of reel strips decreasing with subsequent symbol position states, the number of symbol positions in one or more reel strips may increase with subsequent symbol position states. In either such example, the types of symbols in real strips may be adjusted to achieve a desired RTP.

In this example, each reel strip has at least one "Feather" symbol (e.g. Feather symbol 332) which is a defined symbol that can be collected to cause an expansion condition to be met as described in further detail below.

Figure 4:
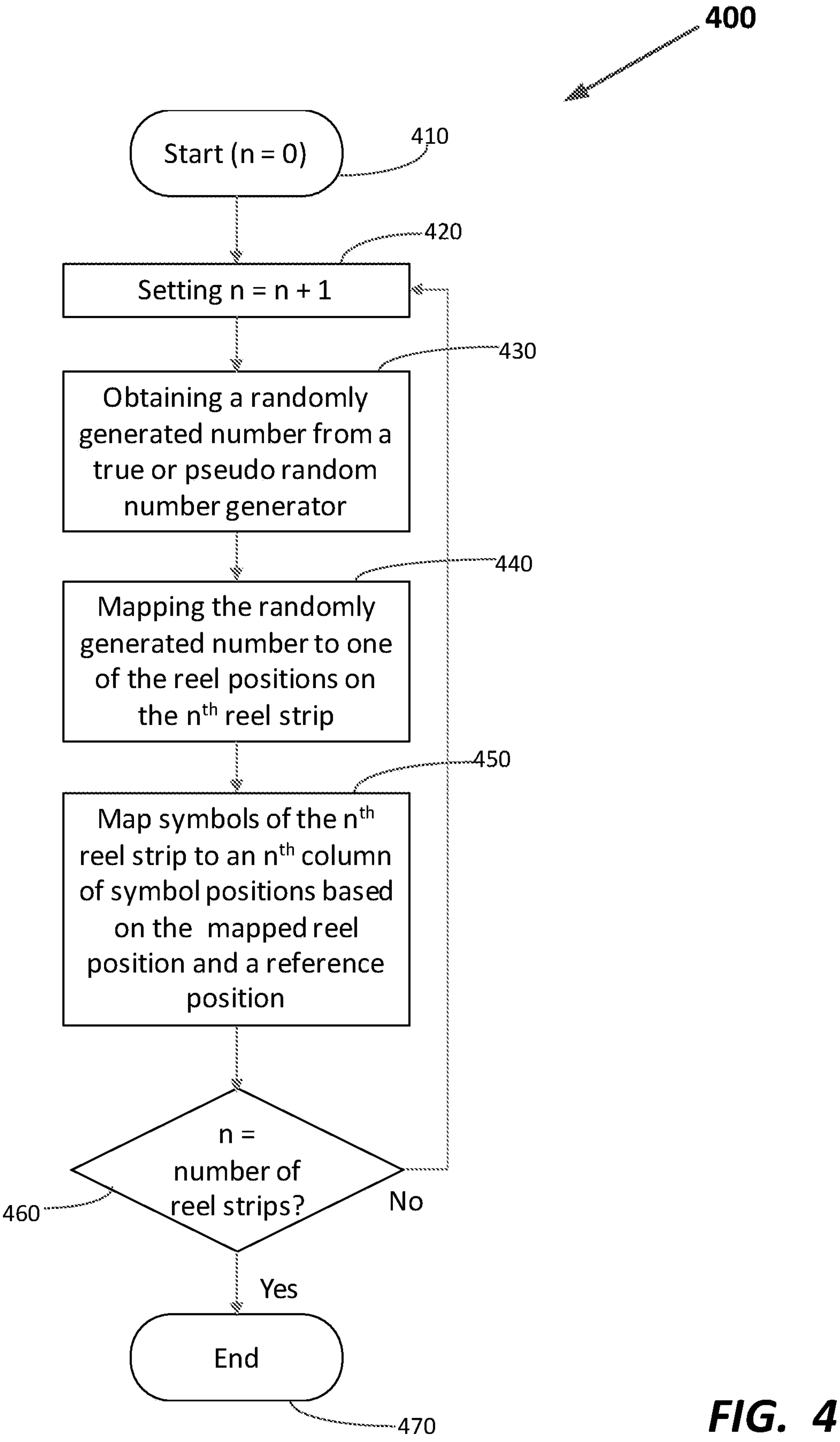
FIG. 4 is a flow chart of a symbol selection method.

At step 550, the processor selects symbols for display at the active symbol positions. FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. That is, leaving aside for a moment that the illustrated set of reel strips corresponds to eight symbol positions being active for each reel, and considering the example shown in FIG. 9, there are two other active symbol positions in the firth column of symbol positions 921 in addition to the symbol position in the bottom row 911 and hence symbols at two neighbouring reel strip positions are also mapped to the symbol positions of the column. Referring to the example reel strips of FIG. 3, if the value returned by the RNG 212 is mapped to reel position 313, then for the first reel strip 321, "Pic 1" symbol 353 is mapped to a bottom symbol position, "10" symbol 352 is mapped to a middle symbol position, and "Pic 2" symbol 351 is mapped to a top symbol position. Each time the number of active symbol positions increases by one, an additional symbol position is mapped.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions. An example of selected symbols for a first free game instance is shown in the example screen display 1000 of FIG. 10 from which it will be observed that some of the symbols of a stack 1061-63 have been selected.

After the symbols are selected, at step 555, the processor 204 evaluates the selected symbols for winning combinations based on a pay table stored in memory. In this example, processor 204 applies a "ways to win" type evaluation by processing the selected symbols to identify instances of the same symbol appearing in consecutive ones of the columns 921-925 starting with (and including) the first column.

At step 560, the processor 204 determines whether the selected symbols include one or more defined symbols, in this example, the feather symbol. For example, as shown in FIG. 10, there are two feather symbols 1051,1052 among the selected symbols.

Figure 10:
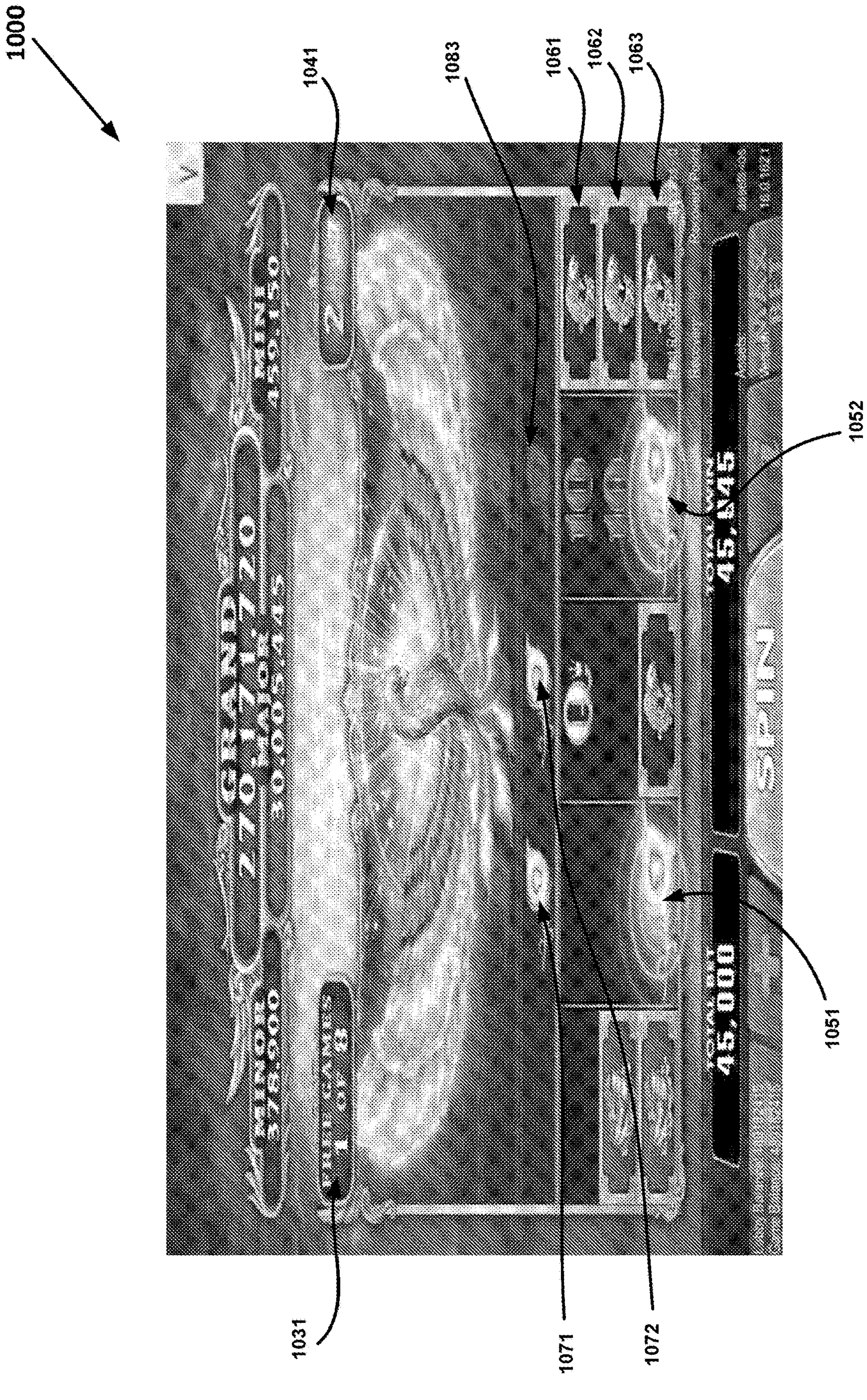

Accordingly, in the case of the game outcome of FIG. 10, the processor proceeds to step 565 and updates the symbol counter in memory 208 by adding the value of two to the counter. The processor 204 also controls the display to visually represent the counter 1041 with the value of two symbol collected. In this example, the processor also controls the display 240 to display progress towards activating the fourth row 914 by modifying it so that is shows two lit feather symbols 1071, 1072 with only one greyed-out symbol 1083. This indicates to the player that a third feather symbol will activate the fourth line 914.

At step 570, the processor 204 determines whether a trigger condition is met. In the example of FIG. 5, the trigger condition is an expansion condition. In this example, the expansion conditions are the collection of 3, 6, 9, 12 and 15 feather symbols. In other examples, different numbers may be used and they need not be multiples of one another. In the example, of FIG. 10, an expansion condition is not met as only two feather symbols have been collected and hence the processor proceeds to step 585 and determines whether the counter has reached zero. If not, as will be the case following the display of FIG. 10 which shows a first free game, the processor 204 reverts to step 530 and iterates through the following steps. In other examples, the trigger condition determined at 570 (as an expansion condition) will further trigger one or more free games.

Figure 11:
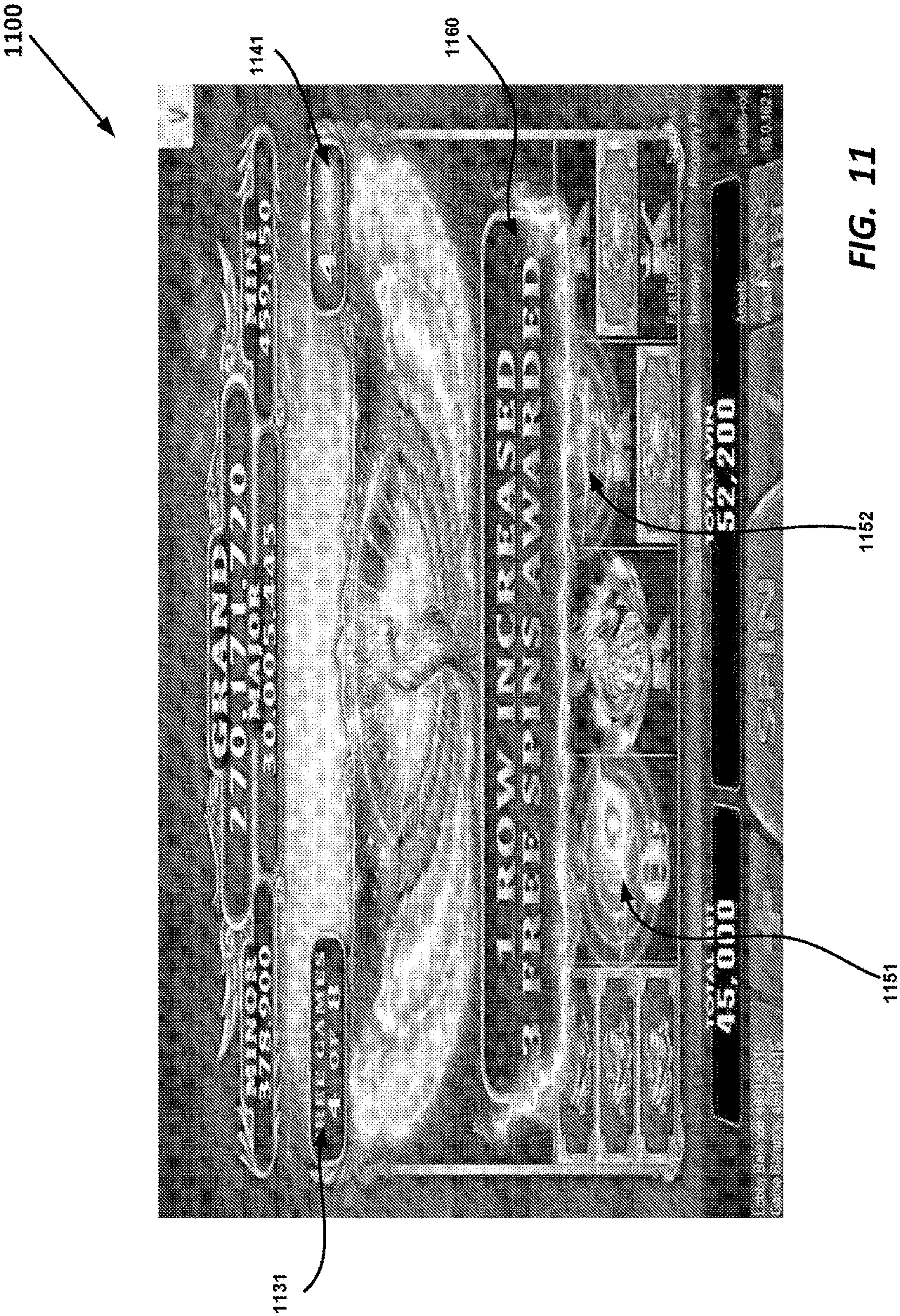

FIG. 11 shows an example screen display 1100 just after conduct of a fourth free game 1131. Two further feather symbols 1151, 1152 have been selected leading to an updated defined symbol counter 1141 value of 4. As a result, at step 570, the processor determines that the first expansion condition is met and proceeds to step 575 of updating the symbol position state in memory 208 to the next state, which in this example will result in this case in the processor 204 activating the fourth row 914 when it iterates back to step 535. At step 580, the processor increments the counter in order to award at least one additional game instance, and in this example, three additional game instances. A message 1160 of "1 Row Increased. 3 Free Spins Awarded" communicates to the player both that the expansion condition has been met and that three additional game instances have been added to the series of game instances. It is advantageous to increment the counter in this way as it avoids a situation of an expansion condition being met without an additional game in which to see the benefit of it. However, in other embodiments, the number of free game instances may be fixed, or in some cases may be randomly determined.

Figure 12:
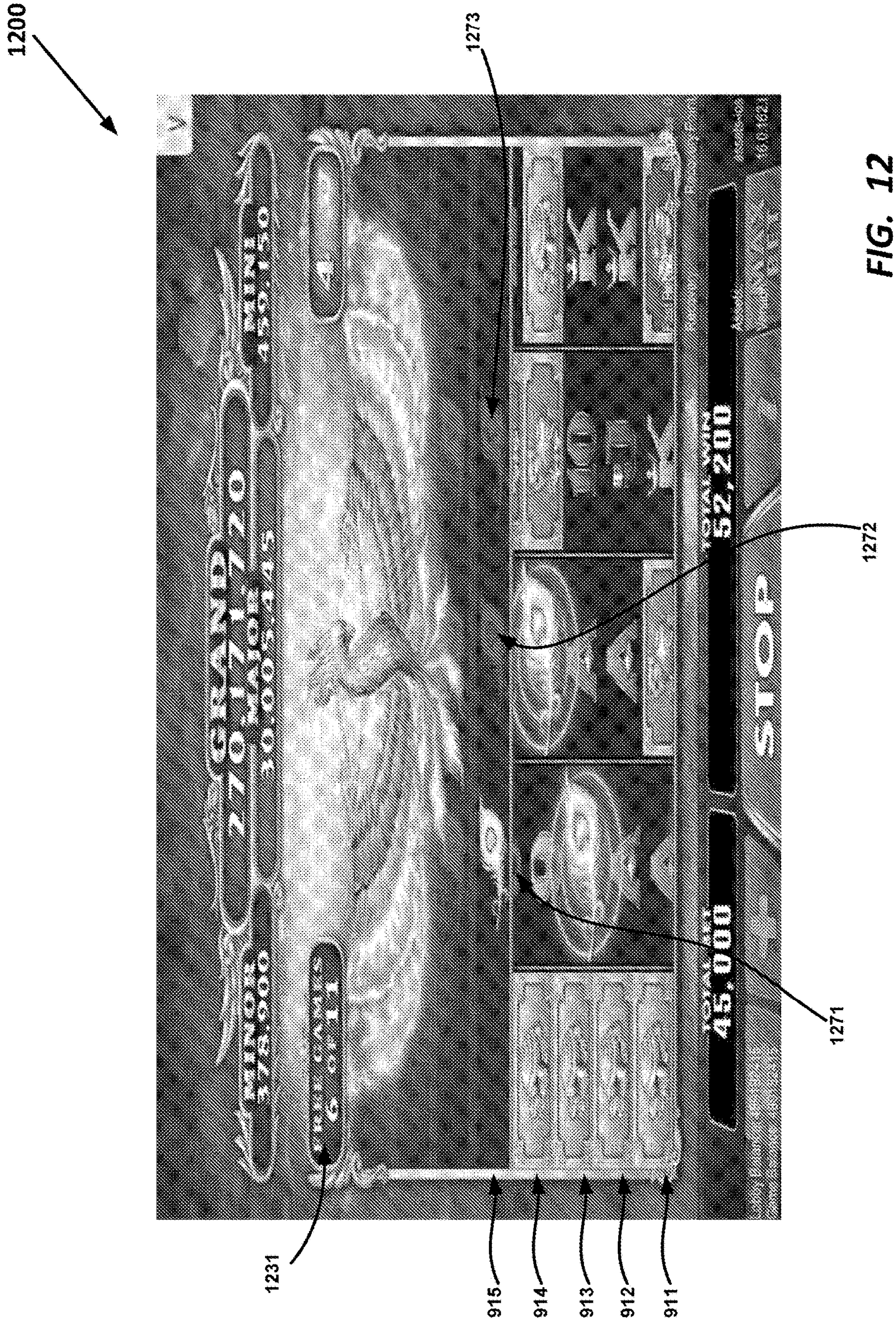
Figure 13:
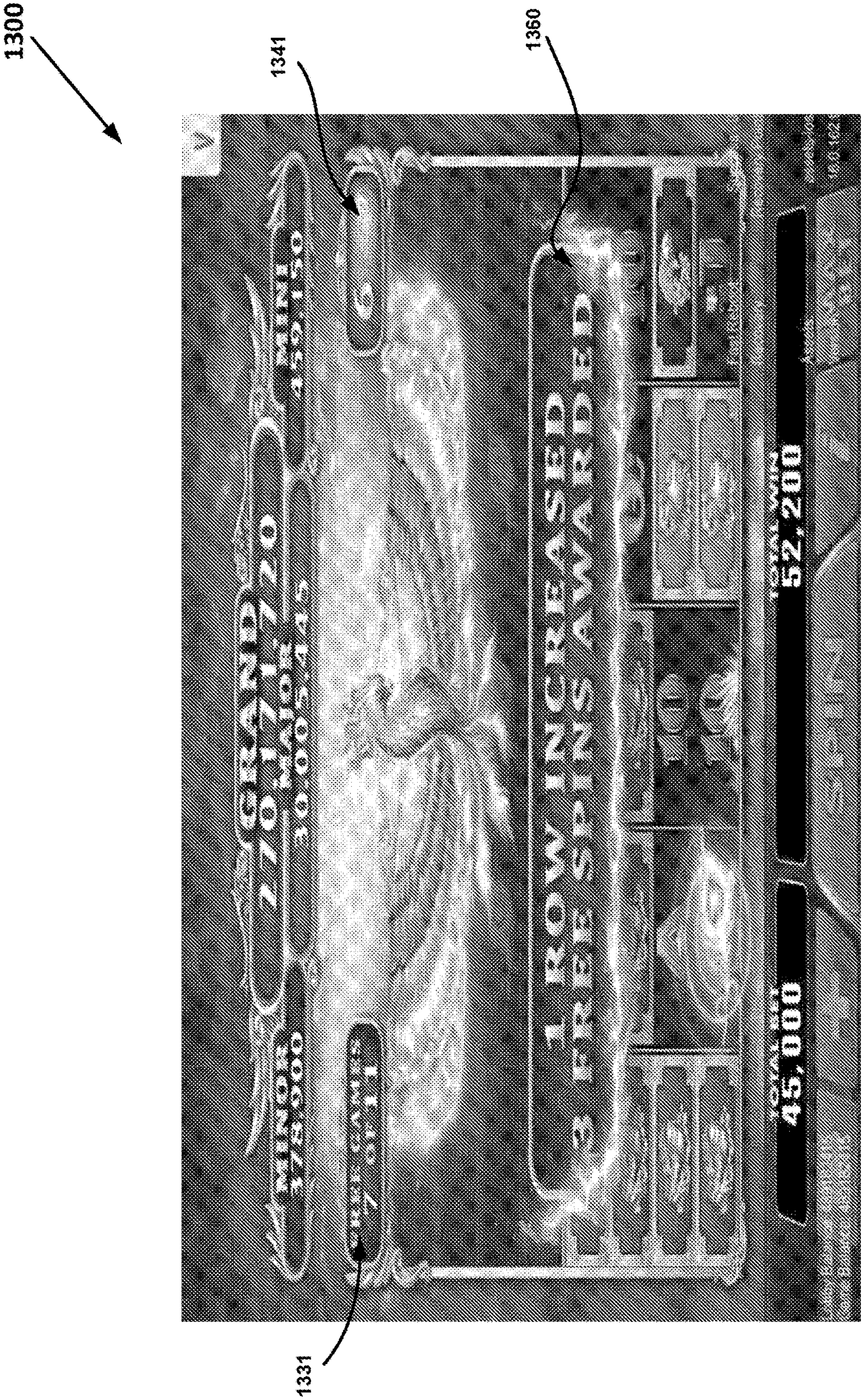

Accordingly, following an example such as that shown in FIG. 11, at step 535, the processor 204 will display four active rows of symbols such as shown in FIG. 12 which shows an example during a sixth free game 1231 where the reels are being displayed as spinning with four rows active 911-914 and the fifth row 915 now showing progress towards being activated in the form of one lit feather symbol 1271 and two greyed-out feather symbols 1272,1273. It will be that as the processor continues to iterate through the loop shown in FIG. 5, a further expansion condition may be met. For example, FIG. 13 shows an example screen display 1300 where the expansion condition of six feather symbols 1341 has been met in the seventh free game instance of eleven 1331 leading to another message of "1 Row Increased. 3 Free Spins Awarded" 1360 being displayed.

Figure 14:

FIG. 14 shows a screen display 1300 of a ninth free game of fourteen 1431 where the current defined symbol counter value 1441 is that seven defined symbols have been collected. In this example, five rows 911-915 are active and one feather symbol is lit on the sixth row.

Figure 15:
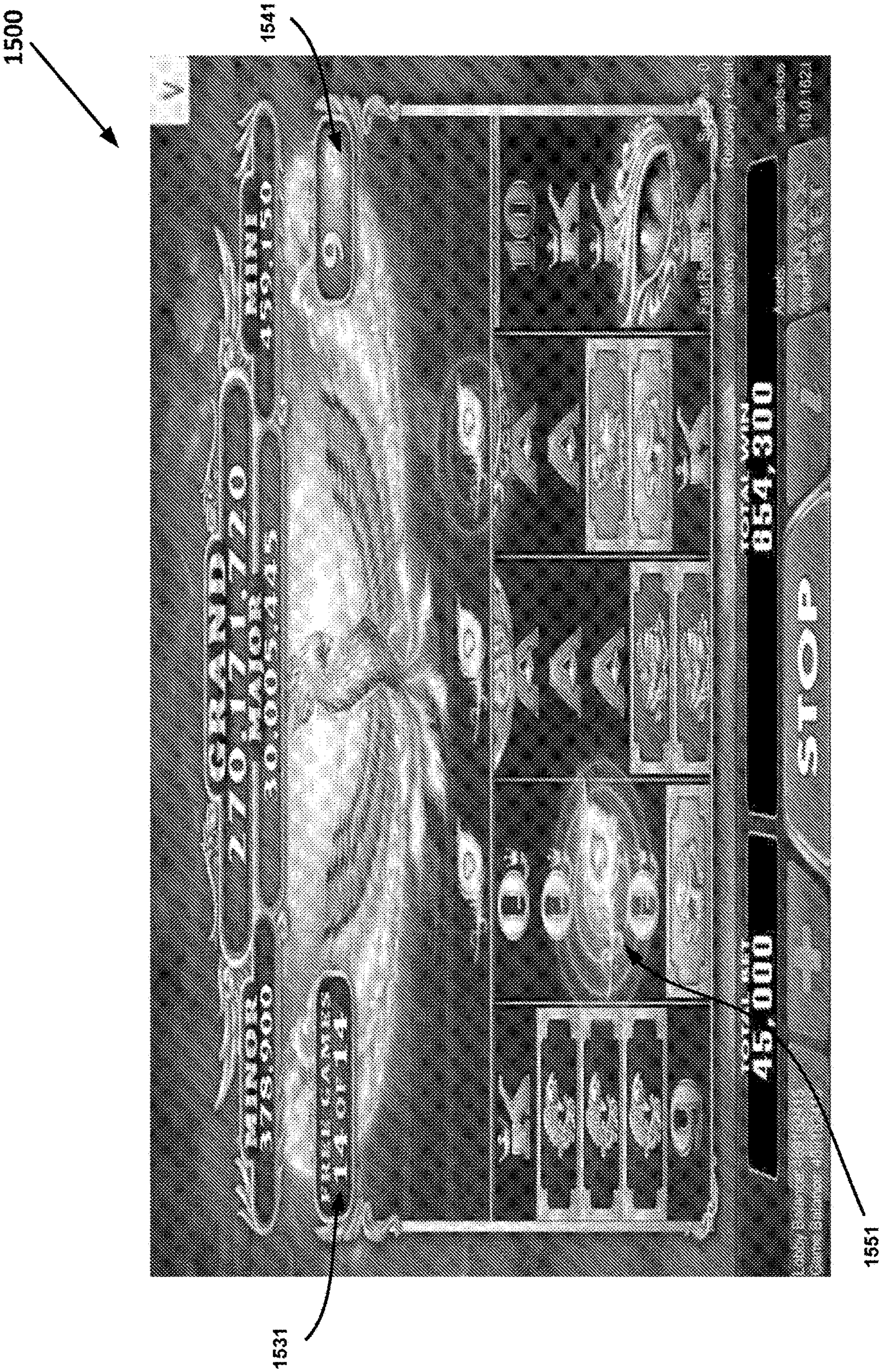
Figure 16:
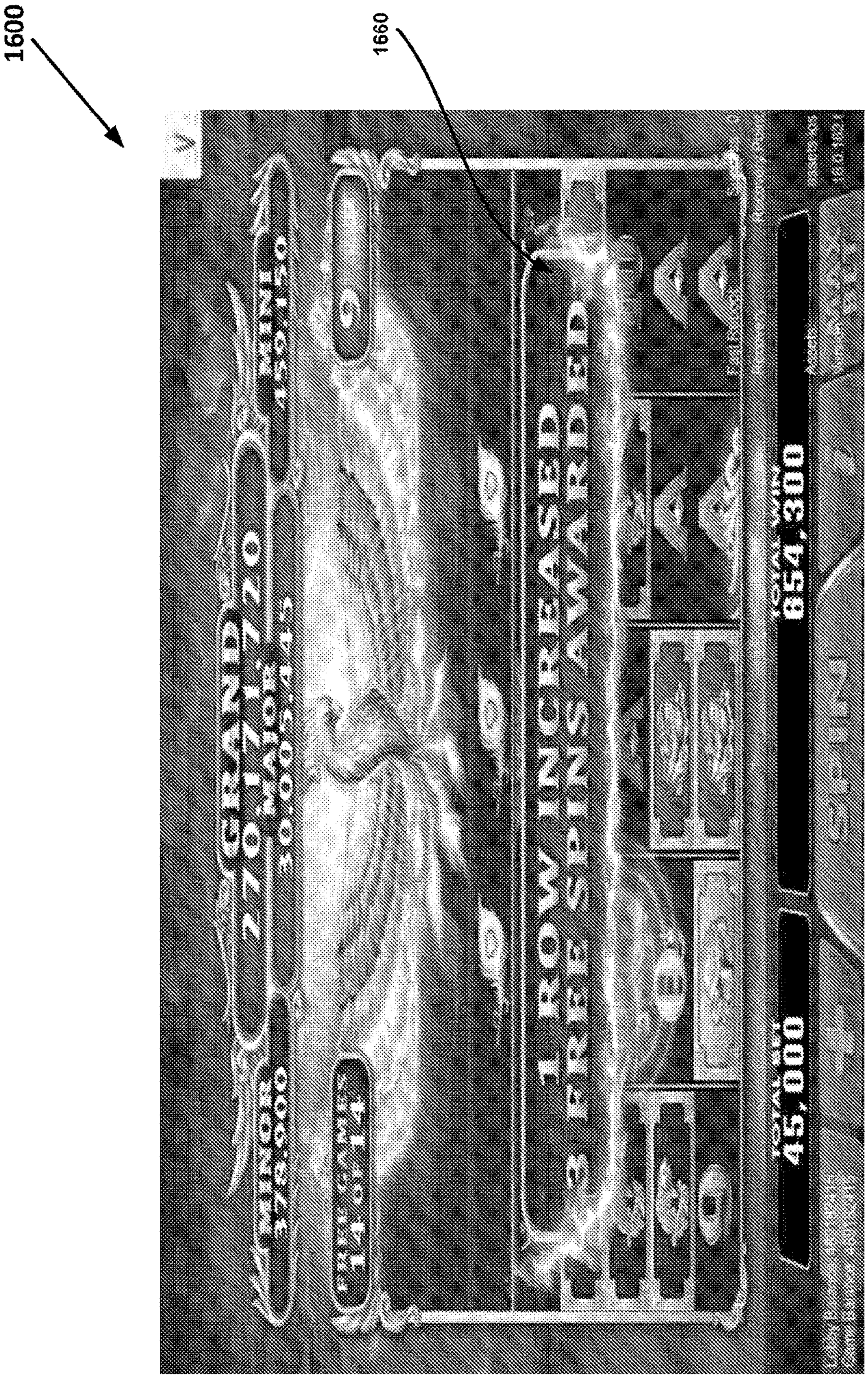

FIG. 15 is a screen display 1400 indicating that event when an expansion condition is met in a free game instance that is currently indicated 1531 as being the final free game instance (here by the selection of feather symbol 1551 resulting in a total of nine feather symbols 1541), the series free games will continue due to the award of three additional free games at step 580 as shown by message 1660 in FIG. 16. That is, in this example, the free game counter will have reached zero after step 530 but be increased to three at step 580 so that following step 585, the processor 204 will proceed to step 530 and iterate through the loop again.

When the counter is zero at step 585, the process ends and the processor 204 awaits a further wager.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

a processor; and a memory storing instructions which, when executed by the processor, cause the processor to:

initiate a series of multiple instances of a game, including, at a beginning of the series of multiple instances of the game, controlling a display to display columns of symbol positions;

in at least a first instance of the game, select symbols from a first set of reel strips having a first stack length for display in the columns of symbol positions; and in response to an expansion triggered condition:

display an animation on the display showing an expansion of a number of rows corresponding to at least one additional active symbol position in each of the columns of symbol positions; and in at least a subsequent instance of the game, select symbols from a second set of reel strips having a second stack length shorter than the first stack length for display in the columns of symbol positions, wherein the processor calculates a change to symbol selection odds corresponding to addition of the at least one additional active symbol position and compensates for the change using the selection of the symbols from the second set of reel strips as opposed to from the first set of reel strips to maintain the symbol selection odds and compensate for the addition of the at least one additional active symbols position.

2. The gaming device of claim 1, wherein the instructions, when executed by the processor, further cause the processor to determine a game outcome based on a random number generator outcome.

3. The gaming device of claim 2, wherein the instructions, when executed by the processor, further cause the processor to control the display to present the game outcome.

4. The gaming device of claim 2, wherein the instructions, when executed by the processor, further cause the processor to evaluate selected symbols for the game outcome.

5. The gaming device of claim 1, wherein the first stack length defines a number of consecutive reel strip positions having a common configurable symbol.

6. The gaming device of claim 1, wherein the gaming device includes the display.

7. The gaming device of claim 1, wherein the display is a component of an electronic device with which the gaming device communicates.

8. The gaming device of claim 7, wherein the instructions, when executed by the processor, further cause the processor to transmit a message to the electronic device to display the animation.

9. The gaming device of claim 1, wherein the game comprises a feature game triggered from a base game.

10. The gaming device of claim 1, wherein the instructions, when executed by the processor, further cause the processor to increment a defined symbol counter responsive to selection of one or more defined symbols.

11. The gaming device of claim 10, wherein the expansion triggered condition is met by the defined symbol counter reaching a defined number.

12. The gaming device of claim 1, wherein the expansion triggered condition includes a first expansion condition of multiple expansion conditions.

13. The gaming device of claim 1, wherein the memory further stores symbol position data states.

14. The gaming device of claim 1, wherein the memory further stores the first set of reel strips and the second set of reel strips.

15. A method, comprising:

initiating a series of multiple instances of a game, including, at a beginning of the series of multiple instances of the game, controlling a display to display columns of symbol positions;

in at least a first instance of the game, selecting symbols from a first set of reel strips having a first stack length for display in the columns of symbol positions; and in response to an expansion triggered condition:

displaying an animation on the display showing an expansion of a number of rows corresponding to at least one additional active symbol position in each of the columns of symbol positions;

in at least a subsequent instance of the game, selecting symbols from a second set of reel strips having a second stack length shorter than the first stack length for display in the columns of symbol positions;

calculating a change to symbol selection odds corresponding to addition of the at least one additional active symbol position;

compensating for the change using the selection of the symbols from the second set of reel strips as opposed to from the first set of reel strips to maintain the symbol selection odds and compensate for the addition of the at least one additional active symbols position; and in at least the subsequent instance of the game, selecting symbols from the second set of reel strips for display in the columns of symbol positions.

16. The method of claim 15, wherein the displaying the animation on the display includes transmitting a message to an electronic device that includes the display.

17. The method of claim 15, further comprising determining a game outcome based on a random number generator outcome.

18. A computer program product stored in a non-transitory storage medium comprising:

first instructions executable by at least one processor to initiate a series of multiple instances of a game, including, at a beginning of the series of multiple instances of the game, causing a display to display columns of symbol positions;

second instructions executable by the at least one processor to, in at least a first instance of the game, select symbols from a first set of reel strips having a first stack length for display in the columns of symbol positions; and third instructions executable by the at least one processor to, in response to an expansion triggered condition:

cause display of an animation on the display showing an expansion of a number of rows corresponding to at least one additional active symbol position in each of the columns of symbol positions;

in at least a subsequent instance of the game, select symbols from a second set of reel strips having a second stack length shorter than the first stack length for display in the columns of symbol positions;

calculate a change to symbol selection odds corresponding to addition of the at least one additional active symbol position;

compensate for the change using the selection of the symbols from the second set of reel strips as opposed to from the first set of reel strips to maintain the symbol selection odds and compensate for the addition of the at least one additional active symbol position; and in at least the subsequent instance of the game, select symbols from the second set of reel strips for display in the columns of symbol positions.

19. The computer program product of claim 18, further comprising fourth instructions executable by the at least one processor to evaluate selected symbols.

20. The computer program product of claim 18, wherein the third instructions are further executable by the at least one processor to cause display of the animation on the display by transmitting at least one message to a gaming device that includes the display.

* * * * *